United States Patent [19]

Lie et al.

[11] Patent Number: 5,420,969
[45] Date of Patent: May 30, 1995

[54] APPARATUS USING MEAN VALUE IMAGE SMOOTHING FOR A TWO-DIMENSIONAL IMAGE SIGNAL

[75] Inventors: Ching-Sheng Lie; Hwaw-Jang Jih, both of Hsinchu, Taiwan, Prov. of China

[73] Assignee: Winbond Electronic Corp., Hsinchu, Taiwan, Prov. of China

[21] Appl. No.: 136,557

[22] Filed: Oct. 14, 1993

[51] Int. Cl.$^6$ .............................................. G06T 5/00
[52] U.S. Cl. .................................... 395/133; 395/128; 395/132; 395/162
[58] Field of Search ................................ 395/118–120, 395/125–132, 133, 134, 141, 162–164, 166; 358/432; 345/136–138

[56] References Cited

U.S. PATENT DOCUMENTS

| | | | |
|---|---|---|---|
| 5,168,375 | 12/1992 | Reisch et al. | 358/432 |
| 5,315,692 | 5/1994 | Hansen et al. | 395/119 |
| 5,325,474 | 6/1994 | Kumazaki et al. | 395/133 |

*Primary Examiner*—Almis Jankus
*Attorney, Agent, or Firm*—Harness, Dickey & Pierce

[57] ABSTRACT

An image smoothing apparatus includes an image data providing device, an input buffer, a memory control unit, a horizontal mean value computing device, an intermediate stage memory device, a transverse mean value computing device, and an output buffer. The input buffer receives two original pixel data at each time from the image data providing device. One of the original pixel data is an nth pixel data of a ith column scan line, while the other one of the original pixel data is an nth pixel data of a (i+1)th column scan line. The horizontal mean value computing device receives the original pixel data from the image data providing device via the input buffer, and generates a smoothed image signal after all of the original pixel data have been processed. The smoothed image signal from the horizontal mean value computing device is stored in the intermediate stage memory device. The transverse mean value computing device receives the smoothed image signal from the intermediate stage memory device, and generates a final smoothed image signal which is stored in the output buffer after all of the smoothed pixel data have been processed.

6 Claims, 4 Drawing Sheets

$X_{11}$  $X_{12}$       $H_{11}$ $X_{21}$  $X_{22}$  $\Rightarrow$  $H_{21}$

FIG.1A

$X_{11}$  $X_{12}$ $\Rightarrow$  $T_{11}$  $T_{12}$ $X_{21}$  $X_{22}$

FIG.1B

$X_{11}$  $X_{12}$              $H_{11}$ $\Rightarrow T_{11}$   $T_{12} \Rightarrow$  C $X_{21}$  $X_{22}$              $H_{21}$

FIG.1C

$$
\begin{array}{llll}
(a_{11} & a_{12}) & (a_{13} & a_{14}) \\
(a_{21} & a_{22}) & (a_{23} & a_{24}) \\
(a_{31} & a_{32}) & (a_{33} & a_{34}) \\
(a_{41} & a_{42}) & (a_{43} & a_{44})
\end{array}
$$

⇒

$$
\begin{array}{llll}
(a_0 & H_{11}) & (H_{12} & H_{13}) \\
(a_0 & H_{21}) & (H_{22} & H_{23}) \\
(a_0 & H_{31}) & (H_{32} & H_{33}) \\
(a_0 & H_{41}) & (H_{42} & H_{43})
\end{array}
$$

⇒

$$
\begin{array}{lll}
T_{11} & T_{12} & T_{13} \\
T_{21} & T_{22} & T_{23} \\
T_{31} & T_{32} & T_{33}
\end{array}
$$

FIG.4

APPARATUS USING MEAN VALUE IMAGE SMOOTHING FOR A TWO-DIMENSIONAL IMAGE SIGNAL

BACKGROUND OF THE INVENTION

1. Field of the Invention

The invention relates to a method and apparatus for smoothing an image signal, more particularly to an image smoothing apparatus which employs a mean value image smoothing technique to smoothen a two-dimensional image signal.

2. Description of the Related Art

Various image signal smoothing techniques which operate on spatial or frequency domain have been developed in order to decrease or eliminate the presence of noise. One example of a conventional image signal smoothing technique is the mean value image smoothing. In the mean value image smoothing, every pixel of an image signal is replaced by a mean value of the image signal at a plurality of pixels in the neighborhood or vicinity of said pixel. The mathematical equation for finding a smoothed value g(x,y) of a pixel f(x,y) of an image signal which has a total number of N×N pixels is as follows:

$$g(x,y) = \frac{1}{M} \sum_{(n,m) \in S} f(n,m) \quad (1)$$

wherein, x=0, 1, 2, 3, ... N−1;
y=0, 1, 2, 3, ... N−1;

"S" is a predetermined region (X,Y) which contains a plurality of pixels in the vicinity of the pixel f(n,m); and M=the number of pixels in "S".

Note that mean value image smoothing can be accomplished in a horizontal direction, in a transverse direction, or in a combination of both directions. Three equations which represent three types of mean value image smoothing techniques may be derived from equation (1) and are given as follows:

1. Horizontal mean value image smoothing:

$$g(x,y) = \tfrac{1}{2}[f(n,m)+f(n+1,m)] \quad (2)$$

2. Transverse mean value image smoothing:

$$g(x,y) = \tfrac{1}{2}[f(n,m)+f(n,m+1)] \quad (3)$$

3. Center point mean value image smoothing:

$$g(x,y) = \tfrac{1}{4}[f(n,m)+f(n+1,m)+f(n,m+1)+f(n+1,m+1)] \quad (4)$$

Conventional image smoothing apparatus which employ the mean value smoothing technique are relatively slow and are not ideal for processing a large amount of image data because they do not employ pipeline processing. Furthermore, the conventional image smoothing apparatus require the use of large blocks of memory space when in operation.

SUMMARY OF THE INVENTION

Therefore, the objective of the present invention is to provide an image smoothing apparatus which employs pipeline processing to process a series of original image pixels of a two-dimensional image signal in order to smoothen the image signal.

Another objective of the present invention is to provide an image smoothing apparatus which is capable of being operated so as to execute selectively horizontal mean value image smoothing, transverse mean value image smoothing or center point mean value image smoothing of a two-dimensional image signal.

Still another objective of the present invention is to provide an image smoothing apparatus which performs center point mean value image smoothing by executing a horizontal mean value image smoothing procedure to be followed by a transverse mean value image smoothing procedure.

A further objective of the present invention is to provide an image smoothing apparatus which has a relatively small memory requirement when in operation.

Still a further objective of the present invention is to provide an image smoothing apparatus which is capable of smoothing and compressing a two-dimensional image signal.

Accordingly, the image smoothing apparatus of the present invention comprises:

an image data providing means for providing a two-dimensional original image signal which consists of a plurality of original pixel data $a_{1,1}, a_{1,2}, \ldots a_{N,I}$ grouped into a number (I) of successive column scan lines, the image data providing means providing the original pixel data two at each time, one of the original pixel data $a_{n,i}$ that is being provided at each time being an nth original pixel data of an ith one of the column scan lines, the other one of the original pixel data $a_{n,(i+1)}$ that is being provided at each time being an nth original pixel data of an (i+1)th one of the column scan lines;

an input buffer receiving the original pixel data $a_{n,i}, a_{n,(i+1)}$ from the image data providing means and including a first column memory means for storing the original pixel data $a_{1,(i-1)}, a_{2,(i-1)}, \ldots a_{N,(i-1)}$ of an (i−1)th one of the column scan lines;

a memory control unit for controlling the first column memory means to output the original pixel data $a_{n,(i-1)}$ when the original pixel data $a_{n,i}, a_{n,(i+1)}$ are provided by the image data providing device;

a horizontal mean value computing device receiving the original pixel data $a_{n,(i-1)}, a_{n,i}, a_{n,(i+1)}$ from the input buffer, the horizontal mean value computing device determining a mean value of the original pixel data $a_{n,1}, a_{n,(i-1)}$ to obtain a smoothed pixel data $H_{n,j}$ and further determining a mean value of the original pixel data $a_{n,i}, a_{n,(i+1)}$ to obtain a smoothed pixel data $H_{n,(j+1)}$;

the memory control unit controlling the first column memory means to store the original pixel data $a_{n,(i+1)}$ therein so as to replace the original pixel data $a_{n,(i-1)}$ after the smoothed pixel data $H_{n,j}, H_{n,(j+1)}$ have been obtained;

the horizontal mean value computing device generating a two-dimensional smoothed image signal after all of the original pixel data have been processed, the smoothed image signal consisting of a plurality of the smoothed pixel data $H_{1,1}, H_{1,2}, \ldots H_{N,J}$ grouped into a number (J) of successive smoothed column scan lines;

an intermediate stage memory device receiving the smoothed pixel data $H_{1,1}, H_{1,2}, \ldots H_{N,J}$ two at each time, one of the smoothed pixel data $H_{n,j}$ that is being provided at each time being an nth smoothed pixel data of a jth one of the smoothed column scan lines, the other one of the smoothed pixel data $H_{n,(j+1)}$ that is being provided at each time being an nth smoothed pixel data of a (j+1)th one of the smoothed column scan lines, the memory device including a second column memory means for storing the smoothed pixel data $H_{1,(j-1)}$, $H_{2,(j-1)}$, ... $H_{N,(j-1)}$ of a (j−1)th one of the smoothed column scan lines;

the memory control unit controlling the second column memory means to output the smoothed pixel data $H_{n,(j-1)}$ when the smoothed pixel data $H_{n,j}$, $H_{n,(j+1)}$ are generated by the horizontal mean value computing device;

the memory device further including a row memory means for storing the smoothed pixel data $H_{n,(j-1)}$ from the second column memory means and the smoothed pixel data $H_{n,j}$, the row memory means being controlled by the memory control unit to output the smoothed pixel data $H_{n,(j-1)}$, $H_{n,j}$;

the memory control unit further controlling the second column memory means to store the smoothed pixel data $H_{n,(j+1)}$ therein so as to replace the smoothed pixel data $H_{n,(j-1)}$ after the smoothed pixel data $H_{n,(j-1)}$, $H_{n,j}$ have been stored in the row memory means;

a transverse mean value computing device receiving the smoothed pixel data $H_{n,(j-1)}$, $H_{n,j}$ from the row memory means and a succeeding smoothed pixel data $H_{(n+1),(j-1)}$, $H_{(n+1),j}$ from the horizontal mean value computing device, the transverse mean value computing device determining a mean value of the pixel data $H_{n,(j-1)}$, $H_{(n+1),(j-1)}$ so as to obtain a final smoothed pixel data $T_{k,j}$, and further determining a mean value of the pixel data $H_{n,j}$, $H_{(n+1),j}$ so as to obtain a final smoothed pixel data $T_{k,(j+1)}$; and an output buffer for storing the final smoothed pixel data $T_{k,j}$, $T_{k,(j+1)}$ therein;

the memory control unit further controlling the row memory means to store the succeeding smoothed pixel data $H_{(n+1),(j-1)}$, $H_{(n+1),j}$ in the row memory means so as to replace the smoothed pixel data $H_{n,(j-1)}$, $H_{n,j}$ after the final smoothed pixel data $T_{k,j}$, $T_{k,(j+1)}$ have been stored in the output buffer.

BRIEF DESCRIPTION OF THE DRAWINGS

Other features and advantages of the present invention will become apparent in the following detailed description of the preferred embodiment, with reference to the accompanying drawings, of which:

FIG. 1A illustrates how four original image pixels are smoothed in a horizontal direction so as to obtain two smoothed image data;

FIG. 1B illustrates how four original image pixels are smoothed in a transverse direction so as to obtain two smoothed image data;

FIG. 1C illustrates how four original image pixels are smoothed in both the horizontal and transverse directions so as to obtain a smoothed image pixel;

FIG. 4 illustrates how the preferred embodiment processes a 4×4 original image signal into a 3×3 smoothed image signal during a center point mean value image smoothing operation.

DETAILED DESCRIPTION OF THE PREFERRED EMBODIMENT

Referring to FIG. 1A, when four original image pixels ($X_{11}$, $X_{12}$, $X_{21}$, $X_{22}$) are smoothed with the use of horizontal mean value image smoothing, two smoothed image data ($H_{11}$, $H_{21}$) may be obtained. Mathematically, the above operation can be represented by the following equations:

$$H_{11} = \tfrac{1}{2}(X_{11}+X_{12}) \quad H_{21} = \tfrac{1}{2}(X_{21}+X_{22})$$

Referring to FIG. 1B, when the four original image pixels ($X_{11}$, $X_{12}$, $X_{21}$, $X_{22}$) are smoothed with the use of transverse mean value image smoothing, two smoothed image data ($T_{11}$, $T_{12}$) are similarly obtained. Mathematically, the above operation can be represented by the following equations:

$$T_{11} = \tfrac{1}{2}(X_{11}+X_{21}) \quad H_{12} = \tfrac{1}{2}(X_{12}+X_{22})$$

Referring to FIG. 1C, when the four original image pixels ($X_{11}$, $X_{12}$, $X_{21}$, $X_{22}$) are smoothed with the use of both horizontal and transverse mean value image smoothing, a smoothed image pixel (C) may be obtained. Mathematically, the above operation can be represented by the following equations:

$$C = \tfrac{1}{4}(H_{11}+H_{21}+T_{11}+T_{12}) = \tfrac{1}{4}(X_{11}+X_{12}+X_{21}+X_{22})$$

Figure 2:
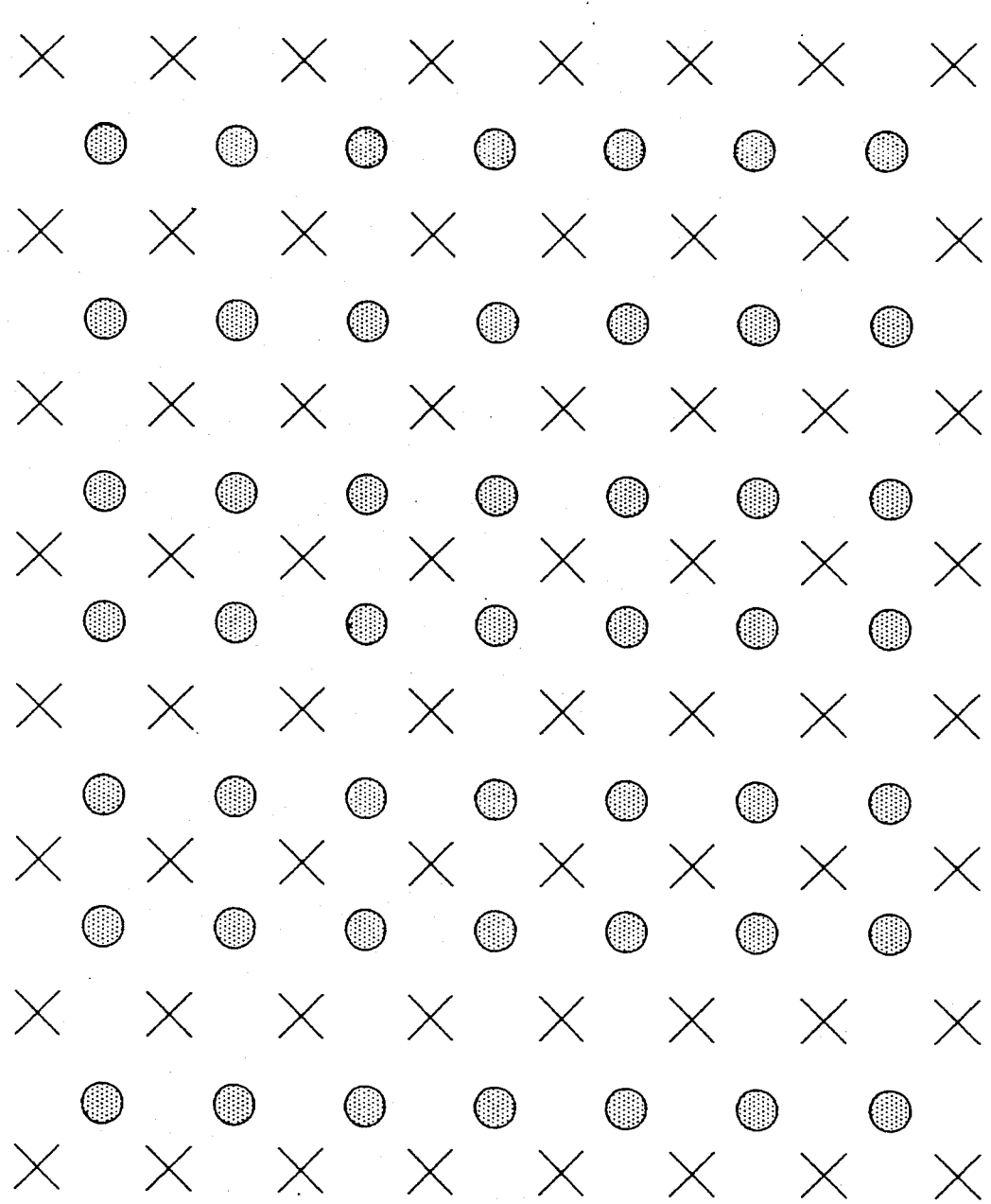
FIG. 2 illustrates an N×N image signal after having undergone both horizontal and transverse mean value image smoothing with the use of the preferred embodiment of an image smoothing apparatus according to the present invention.

FIG. 2 illustrates an N×N image signal after having undergone both horizontal and transverse mean value image smoothing with the use of the image smoothing apparatus of the present invention. The "X" marks indicate the original image pixels, while the "O" marks indicate the smoothed image pixels after the original image pixels have been processed by the image smoothing apparatus of this invention. It has been mentioned beforehand that when the image smoothing apparatus of this invention performs center point mean value image smoothing to process original image pixels, a horizontal mean value image smoothing procedure is first executed to be followed by a transverse mean value image smoothing procedure.

Figure 3:
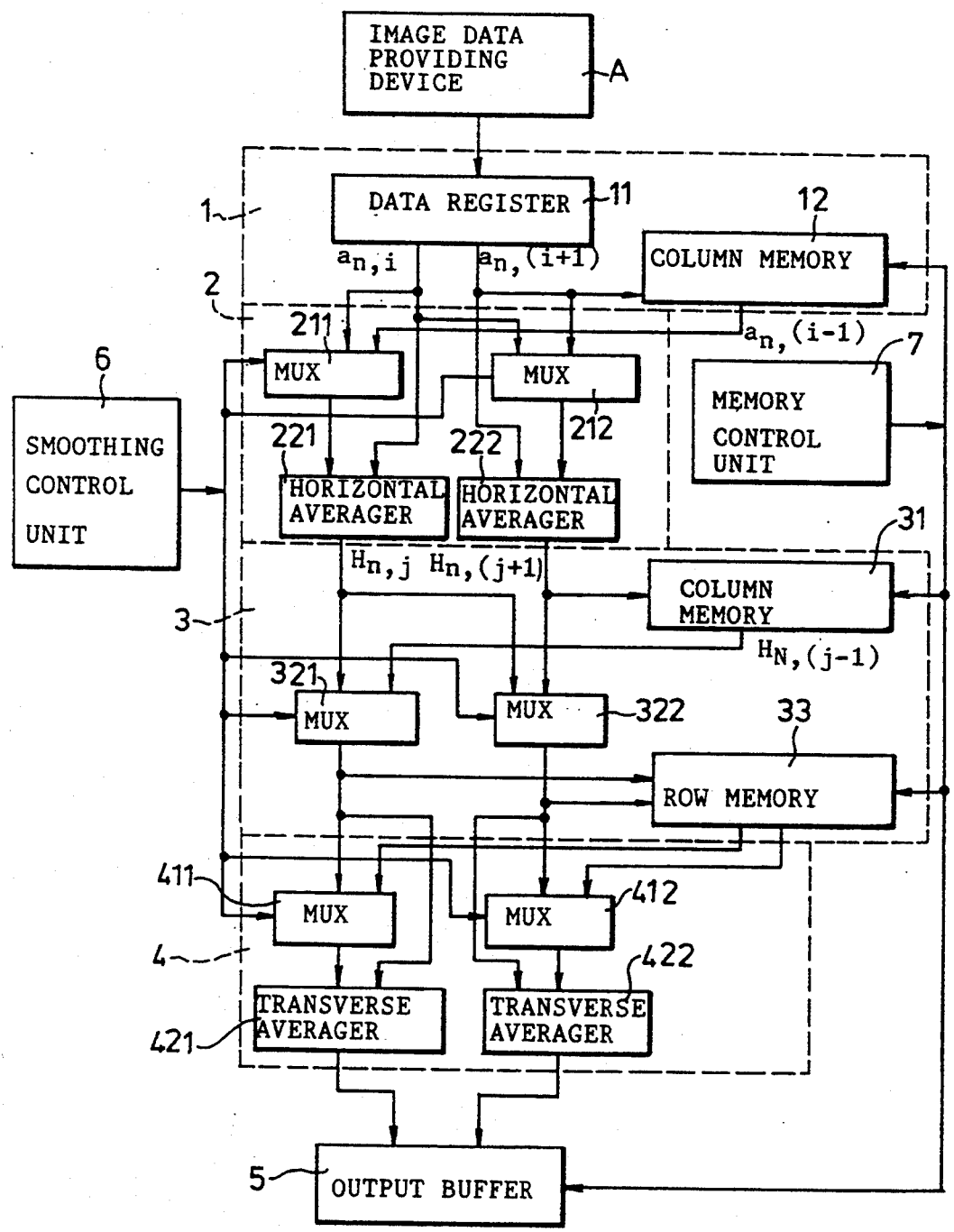
FIG. 3 is a schematic block diagram of the preferred embodiment.

Referring to FIG. 3, the preferred embodiment of an image smoothing apparatus according to the present invention is shown to comprise an image data providing device (A), an input buffer 1, a horizontal mean value computing device 2, an intermediate stage memory unit 3, a transverse mean value computing device 4, an output buffer 5, a smoothing control unit 6 and a memory control unit 7.

The input buffer 1 is connected to the image data providing device (A) and includes a data register 11 and a column memory 12. The image data providing device (A) provides a two-dimensional original image signal consisting of a plurality of original pixel data $a_{1,1}$, $a_{1,2}$, ... $a_{N,I}$ grouped into a number (I) of successive column scan lines. The image data providing device (A) provides two original pixel data at each time to the input buffer 1. One of the original pixel data $a_{n,i}$ that is being provided at each time is an nth original pixel data of an ith one of the column scan lines. The other one of the original pixel data $a_{n,(i+1)}$ that is being provided at each time is an nth original pixel data of an (i+1)th one of the column scan lines. The column memory 12 receives the original pixel data $a_{n,(i+1)}$ from the data register 11 and contains the original pixel data $a_{1,(i-1)}$, $a_{2,(i-1)}$, ... $a_{N,(i-1)}$ of an (i−1)th one of the column scan lines.

The horizontal mean value computing device 2 includes two multiplexers 211, 212 and two horizontal averagers 221, 222. The multiplexer 211 receives the original pixel data $a_{n,i}$ from the data register 11 and the original pixel data $a_{n,(i-1)}$ from the column memory 12. The multiplexer 212 receives the original pixel data $a_{n,i}$, $a_{n,(i+1)}$ from the data register 11. The horizontal averager 221 receives the output of the multiplexer 211 and the original pixel data $a_{n,i}$ from the data register 11. The horizontal averager 222 receives the output of the multiplexer 212 and the original pixel data $a_{n,(i+1)}$ from the data register 11. The main purpose of the horizontal mean value computing device 2 is to generate smoothed pixel data $H_{n,j}$, $H_{n,(j+1)}$ from the original pixel data that were supplied by the image data providing device (A).

The intermediate stage memory unit 3 includes a column memory 31, two multiplexers 321, 322, and a row memory 33. The column memory 31 receives the smoothed pixel data $H_{n,(j+1)}$ from the horizontal averager 222 and contains the smoothed pixel data $H_{1,(j-1)}$, $H_{2,(j-1)}$, ... $H_{N,(j-1)}$ previously generated by the horizontal averager 222. The multiplexer 321 receives the smoothed pixel data $H_{n,j}$ from the horizontal averager 221 and the smoothed pixel data $H_{n,(j-1)}$ from the column memory 31. The multiplexer 322 receives the smoothed pixel data $H_{n,j}$, $H_{n,(j+1)}$ from the horizontal averagers 321, 322. The outputs of the multiplexers 321, 322 are stored in the row memory 33.

The transverse mean value computing device 4 includes two multiplexers 411, 412 and two vertical averagers 421, 422. The multiplexer 411 receives the output of the multiplexer 321 and one of the smoothed pixel data stored in the row memory 33. The multiplexer 412 receives the output of the multiplexer 322 and the other one of the smoothed pixel data stored in the row memory 33. The transverse averager 421 receives the outputs of the multiplexers 321, 411. The transverse averager 422 receives the outputs of the multiplexers 322, 422. The main purpose of the transverse mean value computing device 4 is to generate final smoothed pixel data from the smoothed pixel outputs $H_{n,j}$, $H_{n,(j+1)}$ of the horizontal mean value computing device 2.

The output buffer 5 is used to store the outputs of the transverse mean value computing device 4. When the image smoothing apparatus of the present invention is operated in a center point mean value smoothing mode, an N×N original image signal is smoothed into an (N−1)×(N−1) smoothed image signal which can be retrieved from the output buffer 5.

The smoothing control unit 6 controls the multiplexers 211, 212, 321, 322, 411, 412 to output a selected one of the input data thereto in accordance with the intended operation, i.e. horizontal mean value image smoothing, transverse mean value image smoothing or center point mean value image smoothing, of the image smoothing apparatus.

The memory control unit 7 is programmed to control the read and write operations of the column memories 12, 31, the row memory 33 and the output buffer 5 at the appropriate times.

For the sake of brevity, the operation of the image smoothing device of the present invention will be described with the use of a 4×4 original image signal:

A. Center point mean value image smoothing

Referring to FIG. 3 and 4, the image data providing device (A) contains an original image signal which consists of a plurality of original pixel data $a_{11}$, $a_{12}$, ... $a_{44}$ grouped into four column scan lines. Initially, the image data providing device (A) supplies two pixel data $a_{11}$, $a_{12}$ to the data register 11 of the input buffer 1. The multiplexer 211 receives the original pixel data $a_{11}$ from the data register 11 and a first invalid column data from the column memory 12. The multiplexer 212 receives the original pixel data $a_{11}$, $a_{12}$ from the data register 11. When it is desired to conduct a horizontal mean value image smoothing operation, the smoothing control unit 6 controls the multiplexer 211 to select the output of the column memory 12, and further controls the multiplexer 212 to select the original pixel data $a_{11}$. The horizontal averager 221 receives the output of the column memory 12 from the multiplexer 211 and the original pixel data $a_{11}$ from the data register 11. The horizontal averager 222 receives the original pixel data $a_{11}$ from the multiplexer 212 and the original pixel data $a_{12}$ from the data register 11. Note that the horizontal averager 221 has an erroneous output $a_o$, while the output $H_{11}$ of the horizontal averager 222 is the mean value of the original pixel data $a_{11}$, $a_{12}$. The original pixel data $a_{12}$ replaces the first invalid column data in the column memory 12 for use when conducting a horizontal mean value smoothing operation for the third column scan line. The output $H_{11}$ of the horizontal averager 222 is then stored in the column memory 31.

The above procedure is repeated for the next six pixel data $a_{21}$, $a_{22}$, $a_{31}$, $a_{32}$, $a_{41}$, $a_{42}$ generated by the image data providing device (A). When processing of the first two column scan lines from the image data providing device (A) has been completed, the column memory 12 contains the four pixel data $a_{12}$, $a_{22}$, $a_{32}$, $a_{42}$ of the second scan line, while the column memory 31 contains four smoothed pixel data $H_{11}$, $H_{21}$, $H_{31}$, $H_{41}$. The transverse mean value computing device 4 has yet to operate at this stage.

When the image data providing device (A) supplies the first two original pixel data $a_{13}$, $a_{14}$ of the next two column scan lines to the data register 11, the multiplexer 211 receives the original pixel data $a_{13}$ from the data register 11 and the original pixel data $a_{12}$ from the column memory 12. The multiplexer 212 receives the original pixel data $a_{13}$, $a_{14}$ from the data register 11. As with the previous operation, the smoothing control unit 6 controls the multiplexer 211 to select the output of the column memory 12, and further controls the multiplexer 212 to select the original pixel data $a_{13}$. The horizontal averager 221 receives the original pixel data $a_{12}$ from the column memory 12 via the multiplexer 211 and the original pixel data $a_{13}$ from the data register 11. The horizontal averager 222 receives the original pixel data $a_{13}$ from the multiplexer 212 and the original pixel data $a_{14}$ from the data register 11. The output $H_{12}$ of the horizontal averager 221 is the mean value of the original pixel data $a_{12}$, $a_{13}$, while the output $H_{13}$ of the horizontal averager 222 is equal to the mean value of the original pixel data $a_{13}$, $a_{14}$. The memory control unit 7 then controls the column memory 12 to store the original pixel data $a_{14}$ therein so as to replace the pixel data $a_{12}$.

When the outputs $H_{12}$, $H_{13}$ of the horizontal averagers 221, 222 become available, the multiplexer 321 receives the output $H_{12}$ of the horizontal averager 221 and the smoothed pixel data $H_{11}$ from the column memory 31, while the multiplexer 322 receives the outputs $H_{12}$, $H_{13}$ of the horizontal averagers 221, 222. The smoothing control unit 6 controls the multiplexer 321 to select the smoothed pixel data $H_{11}$ and further controls the multiplexer 322 to select the output $H_{12}$ of the horizontal averager 221. The outputs $H_{11}$, $H_{12}$ of the multiplexers 321, 322 are stored in the row memory 33. The memory control unit 7 controls the column memory 31 to store the output $H_{13}$ of the horizontal averager 222 therein so as to replace the smoothed pixel data $H_{11}$.

The above procedure is repeated for the succeeding two original pixel data $a_{23}$, $a_{24}$ of the third and fourth column scan lines from the image data providing device (A). When the horizontal averagers 221, 222 generate the outputs $H_{22}$, $H_{23}$, the multiplexer 321 receives the output $H_{22}$ of the horizontal averager 221 and the smoothed pixel data $H_{21}$ from the column memory 31, while the multiplexer 322 receives the outputs $H_{22}$, $H_{23}$ of the horizontal averagers 221, 222. The smoothing control unit 6 controls the multiplexer 321 to select the smoothed pixel data $H_{21}$ and further controls the multiplexer 322 to select the output $H_{22}$ of the horizontal averager 221. The multiplexer 411 receives the output of the multiplexer 321 and the smoothed pixel data $H_{11}$ stored in the row memory 33. The multiplexer 412 receives the output of the multiplexer 322 and the smoothed pixel data $H_{12}$ stored in the row memory 33. When it is desired to conduct a transverse mean value image smoothing operation, the smoothing control unit 6 controls the multiplexer 411 to select the smoothed pixel data $H_{11}$ from the row memory 33, and further controls the multiplexer 412 to select the smoothed pixel data $H_{12}$ from the row memory 33. The transverse averager 421 receives the smoothed pixel data $H_{11}$ from the multiplexer 411 and the smoothed pixel data $H_{21}$ from the multiplexer 321. The transverse averager 422 receives the pixel data $H_{12}$ from the multiplexer 412 and the smoothed pixel data $H_{22}$ from the multiplexer 322. The output $T_{11}$ of the transverse averager 421 is the mean value of the smoothed pixel data $H_{11}$, $H_{21}$, while the output $T_{12}$ of the transverse averager 422 is the mean value of the smoothed pixel data $H_{12}$, $H_{22}$. The memory control unit 7 controls the column memory 31 to store the output $H_{23}$ of the horizontal averager 222 therein so as to replace the smoothed pixel data $H_{21}$, and further controls the row memory to store the outputs $H_{21}$, $H_{22}$ of the multiplexers 321, 322 therein so as to replace the smoothed pixel data $H_{11}$, $H_{12}$. The outputs $T_{11}$, $T_{12}$ of the transverse averagers 421, 422 are stored in the output buffer 5. The entire procedure is executed until all of the pixel data of the 4×4 original image signal have been processed by the image smoothing apparatus of the present invention. At this stage, a 3×3 smoothed final image signal which consists of final smoothed pixel data $T_{11}$, $T_{12}$, ... $T_{33}$ can be retrieved from the output buffer 5.

B. Transverse mean value image smoothing

The horizontal mean value computing device 2 is bypassed when it is desired to perform a transverse mean value image smoothing operation only. Referring once more to FIGS. 3 and 4, the image data providing device (A) initially supplies two original pixel data $a_{11}$, $a_{12}$ to the data register 11 of the input buffer 1. The multiplexer 211 receives the original pixel data $a_{11}$ from the data register 11 and a first invalid column data from the column memory 12. The multiplexer 212 receives the original pixel data $a_{11}$, $a_{12}$ from the data register 11. Since it is not desired to conduct a horizontal mean value image smoothing operation, the smoothing control unit 6 controls the multiplexer 211 to select the original pixel data $a_{11}$ from the data register 11, and further controls the multiplexer 212 to select the original pixel data $a_{12}$. The output of the horizontal averager 221 is equal to the original pixel data $a_{11}$ since the two inputs thereof receive the same data. Similarly, the output of the horizontal averager 222 is equal to the original pixel data $a_{12}$ since the two inputs thereof also receive the same data. Whether or not the original pixel data $a_{12}$ is stored in the column memory 12 becomes unimportant since the multiplexer 211 does not select the output of the column memory 12.

The smoothing control unit 6 then controls the multiplexer 321 to select the output $a_{11}$ of the horizontal averager 221 and further controls the multiplexer 322 to select the output $a_{12}$ of the horizontal averager 222. The outputs $a_{11}$, $a_{12}$ of the multiplexers 321, 322 are then stored in the row memory 33. Whether or not the output $a_{12}$ of the horizontal averager 222 is stored in the column memory 31 becomes unimportant since the multiplexer 321 does not select the output of the column memory 31.

When the next two pixel data $a_{21}$, $a_{22}$ become available at the horizontal averagers 221, 222, the multiplexer 321 provides the pixel data $a_{21}$ to the multiplexer 411, while the multiplexer 322 provides the pixel data $a_{22}$ to the multiplexer 412. Since it is desired to conduct a transverse mean value image smoothing operation, the smoothing control unit 6 controls the multiplexer 411 to select the pixel data all from the row memory 33, and further controls the multiplexer 412 to select the pixel data $a_{12}$ from the row memory 33. The transverse averager 421 receives the pixel data all from the multiplexer 411 and the pixel data $a_{21}$ from the multiplexer 321. The transverse averager 422 receives the pixel data $a_{12}$ from the multiplexer 412 and the pixel data $a_{22}$ from the multiplexer 322. The output $T_{11}$ of the transverse averager 421 is the mean value of the pixel data $a_{11}$, $a_{21}$, while the output $T_{12}$ of the transverse averager 422 is the mean value of the pixel data $a_{12}$, $a_{22}$. The outputs $a_{21}$, $a_{22}$ of the multiplexers 321, 322 replace the pixel data $a_{11}$, $a_{12}$ in the row memory 33, while the outputs $T_{11}$, $T_{12}$ of the transverse averagers 421, 422 are stored in the output buffer 5.

The above procedure is executed until all of the pixel data of the 4×4 original image signal have been processed by the image smoothing apparatus of the present invention. At this stage, a 3×4 smoothed image signal can be obtained from the output buffer 5.

C. Horizontal mean value image smoothing

The transverse mean value computing device 4 is bypassed when it is desired to perform a horizontal mean value image smoothing operation only. Referring again to FIGS. 3 and 4, the image data providing device (A) initially supplies two pixel data $a_{11}$, $a_{12}$ to the data register 11 of the input buffer 1. Since the outputs $a_o$, $H_{11}$ of the horizontal averagers 221, 222 are generated in a manner similar to that described beforehand, a detailed description of the generation of such outputs will not be recited herein.

Since it is not desired to conduct a transverse mean value smoothing operation, the smoothing control unit 6 controls the multiplexer 321 to select the output $a_o$ of the horizontal averager 221 and further controls the multiplexer 322 to select the output $H_{11}$ of the horizontal averager 222. The smoothing control unit 6 also controls the multiplexer 411 to select the output $a_o$ of the multiplexer 321, and further controls the multiplexer 412 to select the output $H_{11}$ of the multiplexer 322. The output of the transverse averager 421 is equal to the output $a_o$ of the multiplexer 411 since the two inputs thereof receive the same data. Similarly, the output of the transverse averager 422 is equal to the output $H_{11}$ of the multiplexer 412 since the two inputs thereof also receive the same data. Whether or not the output of the horizontal averager 222 is stored in the column memory 31 becomes unimportant since the multiplexer 321 does not select the output of the column memory 31. Similarly, whether or not the outputs of the multiplexers 321, 322 are stored in the row memory 33 becomes unimportant because the multiplexers 411, 412 do not select the outputs of the row memory 33.

As with the previously described operations, the outputs $a_o$, $H_{11}$ of the transverse averagers 421, 422 are stored in the output buffer 5. The above procedure is executed until all of the pixel data of the 4×4 original image signal have been processed by the image smoothing apparatus of the present invention. At this stage, a 4×3 smoothed image signal can be obtained from the output buffer 5 by disregarding an erroneous column output consisting of four pixel data $a_o$.

It has thus been shown that the image smoothing apparatus of the present invention is capable of being operated so as to execute selectively horizontal mean value image smoothing, transverse mean value image smoothing or center point mean value image smoothing of a two-dimensional image signal. Furthermore, the image smoothing apparatus is capable of smoothing a two-dimensional image signal at a relatively fast rate since it employs pipeline processing. In addition, the image smoothing apparatus does not require the use of relatively large memory blocks since each of the column memories 12, 31 and the row memory 33 requires a maximum of only N memory spaces. Moreover, the image smoothing apparatus is capable of smoothing and compressing an N×N image signal into an (N−1)×(N−1) image signal at the same time.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

We claim:

1. An image smoothing apparatus, comprising:
   an image providing means for proving a two-dimensional original image signal which consists of a plurality of original pixel data $a_{1,1}$, $a_{2,1}$ . . . $a_{N,I}$ grouped into a number (I) of successive column scan lines, said image providing means providing said original pixel data two at each time, one of said original pixel data $a_{n,i}$ that is being provided at each time being an nth original pixel data of an ith one of said column scan lines, the other one of said original pixel data $a_{n,(i+1)}$ that is being provided at each time being an nth original pixel data of an (i+1)th one of said column scan lines;
   an input buffer receiving said original pixel data $a_{n,i}$, $a_{n,(i+1)}$ from said image data providing means and including a column memory means for storing said original pixel data $a_{1,(i-1)}$, $a_{2,(i-1)}$, . . . $a_{N,(i-1)}$ of an (i−1)th one of said column scan lines therein;
   a memory control means for controlling said column memory means to output said original pixel data $a_{n,(i-1)}$ when said image providing means provides said original pixel data $a_{n,i}$, $a_{n,(i1)}$;
   a horizontal mean value computing device receiving said original pixel data $a_{n,i}$, $a_{n,(i+1)}$, $a_{n,(i-1)}$ from said input buffer, said original mean value computing device including
   a first horizontal averager receiving said original pixel data $a_{n,i}$, $a_{n,(i-1)}$ from said input buffer, said first horizontal averager determining the mean value $H_{n,j}$ of said original pixel data $a_{n,i}$, $a_{n,(i-1)}$; and
   a second horizontal averager receiving said original pixel data $a_{n,i}$, $a_{n,(i+1)}$ from said input buffer, said first horizontal averager determining the mean value $H_{n,j}$ of said original pixel data $a_{n,i}$, $a_{n,(i+1)}$; and
   an output buffer for storing said mean values $H_{n,j}$, $H_{n,(j+1)}$ therein, being employed as smoothed data wherein j refers to the jth column of smoothed pixel data from the horizontal mean value computing device;
   said memory control means further controlling said column memory means to store said original pixel data $a_{n,(i+1)}$ in said column memory means to replace said original pixel data $a_{n,(i-1)}$ after said mean values $H_{n,j}$, $H_{n,(j+1)}$ have been stored in said output buffer.

2. The image smoothing apparatus as claimed in claim 1, wherein said input buffer further comprises a data register which receives said original pixel data $a_{n,i}$, $a_{n,(i+1)}$ from said image data providing means said column memory means receiving said original pixel data $a_{n,(i+1)}$ from said data register.

3. An image smoothing apparatus, comprising:
   an image data providing means for providing a two-dimensional image signal which consists of a plurality of pixel data $H_{1,1}$, $H_{2,1}$, . . . $H_{N,J}$ grouped into a number (J) of successive column scan lines, said image data providing means providing said pixel data two at each time, one of said pixel data $H_{n,j}$ that is being provided at each time being an nth pixel data of a jth one of said column scan lines, the other one of said pixel data $H_{n,(j+1)}$ that is being provided at each time being an nth pixel data of a (j+1)th one of said column scan lines;
   a memory device receiving said pixel data $H_{n,j}$, $H_{n,(j+1)}$ from said image data providing means and including a column memory for storing said pixel data $H_{1,(j-1)}$, $H_{2,(j-1)}$, . . . $H_{N,(j-1)}$ of a (j−1)th one of said column scan lines;
   a memory control unit for controlling said column memory to output said pixel data $H_{n,(j-1)}$ when said image providing means provides said pixel data $H_{n,j}$, $H_{n,(j+1)}$;
   said memory device further including a row memory for storing said pixel data $H_{n,(j+1)}$ from said column memory and said pixel data $H_{n,j}$, said row memory being controlled by said memory control unit to output said pixel data $H_{n,(j-1)}$, $H_{n,j}$;
   said memory control unit controlling said column memory to store said pixel data $H_{n,(j+1)}$ therein to replace said pixel data $H_{n,(j-1)}$ after said pixel data $H_{n,(j-1)}$, $H_{n,j}$ have been stored in said row memory;
   a transverse mean value computing device receiving said pixel data $H_{n,(-1)}$, $H_{n,j}$ from said row memory and succeeding said pixel data $H_{(n+1),(j-1)}$, $H_{(n+1)j}$ from said image data providing means, said transverse mean value computing device including;
   a first transverse averager receiving said pixel data $H_{n,(j-1)}$, $H_{(n+1),(j-1)}$ and determining the mean value $T_{k,j}$ of said pixel data $H_{n,(j-1)}$, $H_{(n-1),(j-1)}$; and a second transverse averager receiving said pixel data $H_{n,j}$, $H_{(n+1),j}$ and determining the mean value $T_{k,(j+1)}$ of said pixel data $H_{n,j}$, $H_{(n+1),j}$; and an output buffer for storing said mean values $T_{k,j}$, $T_{k,(j+1)}$ therein, said mean values $T_{k,j}$, $T_{k,(j+1)}$ being employed as smoothed data wherein k refers to the kth row of smoothed pixel data from the transverse mean value computing device;

said memory control unit further controlling said row memory to store said succeeding pixel data $H_{(n+1),(j-1)}$, $H_{(n+1),j}$ therein so as to replace said pixel data $H_{n,(j-1)}$, $H_{n,j}$ after said mean values $T_{k,j}$, $T_{k,(j+1)}$ have been stored in said output buffer.

4. An image smoothing apparatus, comprising:

an image data providing means for providing a two-dimensional original image signal which consists of a plurality of original pixel data $a_{1,1}, a_{2,1}, \ldots a_{N,I}$ grouped a number (I) of successive column scan lines, said image data providing means providing said original pixel data two at each time, one of said original pixel data $a_{n,i}$ that is being provided at each time being an nth original pixel data of an ith one of said column scan lines, the other one of said original pixel data $a_{n,(i+1)}$ that is being provided at each time being an nth original pixel data of an (i+1)th one of said column scan lines;

an input buffer including a data register for receiving said original pixel data $a_{n,i}$, $a_{n,(i+1)}$ from said image data providing means and including a first column memory means for storing said original pixel data $a_{1,(i-1)}, a_{2,(i-1)}, \ldots a_{N,(i-1)}$ of an (i−1)th one of said column scan lines, said first column memory means receiving said original pixel data $a_{n,(i+1)}$ from said data register;

a memory control unit for controlling said first column memory means to output said original pixel data $a_{n,(i-1)}$ when said original pixel data $a_{n,i}$, $a_{n,(i-1)}$ are provided by said image data providing device;

a horizontal mean value computing device receiving said original pixel data $a_{n,(i-1)}$, $a_{n,i}$, $a_{n,(i+1)}$ from said input buffer, said horizontal mean value computing device including:

a first horizontal averager receiving said original pixel data $a_{n,i}$, $a_{n,(i-1)}$ from said input buffer, said first horizontal averager determining the mean value of said original pixel data $a_{n,i}$, $a_{n,(i+1)}$ to obtain a smoothed pixel data $H_{n,j}$; and a second horizontal averager receiving said original pixel data $a_{n,i}$, $a_{n,(i+1)}$ from said input buffer, said first horizontal averager determining the mean value of said original pixel data $a_{n,i}$, $a_{n,(i+1)}$ to obtain a smoothed pixel data $H_{n,(j+1)}$ wherein j refers to the jth column of smoothed pixel data from the horizontal mean value computing device;

said memory control unit controlling said first column memory means to store said original pixel data $a_{n,(i+1)}$ therein so as to replace said original pixel data $a_{n,(i-1)}$ after said smoothed pixel data $H_{n,j}$, $H_{n,(j+1)}$ have been obtained;

said horizontal mean value computing device generating a two-dimensional smoothed image signal after all of said original pixel data have been processed, said smoothed image signal consisting of a plurality of smoothed pixel data $H_{1,1}, H_{1,2}, \ldots H_{N,J}$ grouped into a number (J) of successive smoothed column scan lines;

an intermediate stage memory device receiving said smoothed pixel data $H_{1,1}, H_{1,2} \ldots H_{N,J}$ two at each time, one of said smoothed pixel data $H_{n,j}$ that is being provided at each time being an nth smoothed pixel data of a jth one of said smoothed column scan lines, the other one of said smoothed pixel data $H_{n,(j+1)}$ that is being provided at each time being an nth smoothed pixel data of a (j+1)th one of said smoothed column scan lines, said memory device including a second column memory means for storing said smoothed pixel data $H_{1,(j+1)}, H_{2,(j-1)}, \ldots H_{N,(j-1)}$ of a (j−1)th one of said smoothed column scan lines;

said memory control unit controlling said second column memory means to output said smoothed pixel data $H_{n,(j-1)}$ when said smoothed pixel data $H_{n,j}$, $H_{n,(j+1)}$ are generated by said horizontal mean value computing device;

said memory device further including a row memory means for storing said smoothed pixel data $H_{n,(j-1)}$ from said second column memory means and said smoothed pixel data $H_{n,j}$, said row memory means being controlled by said memory control unit to output said smoothed pixel data $H_{n,(j-1)}$, $H_{n,j}$;

said memory control unit further controlling said second column memory means to store said smoothed pixel data $H_{n,(j+1)}$ therein so as to replace said smoothed pixel data $H_{n,(j-1)}$ after said smoothed pixel data $H_{n,(j-1)}$, $H_{n,j}$ have been stored in said row memory means;

a transverse mean value computing device receiving said smoothed pixel data $H_{n,(j-1)}$, $H_{n,j}$ from said row memory means and succeeding said smoothed pixel data $H_{(n+1),(j-1)}$, $H_{(n+1),j}$ from said horizontal mean value computing device, said transverse mean value computing device determining a mean value of said pixel data $H_{n,(j-1)}$, $H_{(n+1),(j-1)}$ so as to obtain a final smoothed pixel data $T_{k,j}$ and further determining a mean value of said pixel data $H_{n,j}$, $H_{(n+1),j}$ so as to obtain a final smoothed pixel data $T_{k,(j+1)}$ wherein k refers to the kth row of smoothed pixel data from the transverse mean value computing device; and an output buffer for storing said final smoothed pixel data $T_{k,j}$, $T_{k,(j+1)}$ therein;

said memory control unit further controlling said row memory means to store said succeeding smoothed pixel data $H_{(n+1),(j-1)}$, $H_{(n+1),j}$ in said row memory means so as to replace said smoothed pixel data $H_{n,(j-1)}$, $H_{n,j}$ after said final smoothed pixel data $T_{k,j}$, $T_{k(j+1)}$ have been stored in said output buffer.

5. The image smoothing apparatus as claimed in claim 4, wherein said horizontal mean value computing device further comprises:

a first multiplexer having a first input which receives said original pixel data $a_{n,i}$ from said data register, a second input which receives said original pixel data $a_{n,(i-1)}$ from said first column memory means, and an output;

said first horizontal averager having a first input connected to said output of said first multiplexer and a second input receiving said original pixel data $a_{n,i}$ from said data register;

a second multiplexer having first and second inputs which respectively receive said original pixel data $a_{n,i}$, $a_{n,(i+1)}$ from said data register, and an output;

said second horizontal averager having a first input connected to said output of said second multiplexer and a second input receiving said original pixel data $a_{n,(i+1)}$ from said data register; and a smoothing control unit operable selectively so as to control said first multiplexer to provide said original pixel data $a_{n,i}$ to said first horizontal averager and so as to control said second multiplexer to provide said original pixel data $a_{n,(i+1)}$ when it is desired to bypass a horizontal mean value image smoothing operation.

6. An image smoothing apparatus, comprising:

an image data providing means for providing a two-dimensional original image signal which consists of a plurality of original pixel data $a_{1,1}, a_{2,1}, \ldots a_{N,J}$ grouped into a number (I) of successive column scan lines, said image data providing means providing said original pixel data two at each time, one of said original pixel data $a_{n,i}$ that is being provided at each time being an nth original pixel data of an ith one of said column scan lines, the other one of said original pixel data $a_{n,(i+1)}$ that is being provided at each time being an nth original pixel data of an (i+1)th one of said column scan lines;

an input buffer receiving said original pixel data $a_{n,i}$, $a_{n,(i+1)}$ from said image data providing means and including a first column memory means for storing said original pixel data $a_{1,(i-1)}, a_{2,(i-1)}, \ldots a_{N-1)}$ of an (i−1)th one of said column scan lines;

a memory control unit for controlling said first column memory means to output said original pixel data $a_{n,(i-1)}$ when said original pixel data $a_{n,i}$, $a_{n,(i+1)}$ are provided by said image data providing device;

a horizontal mean value computing device receiving said original pixel data $a_{n,(i-1)}$, $a_{n,i}$, $a_{n,(i+1)}$ from said input buffer, said horizontal mean value computing device determining a mean value of said original pixel data $a_{n,i}$, $a_{n,(i-1)}$ to obtain a smoothed pixel data $H_{n,j}$ and further determining a mean value of said original pixel data $a_{n,j}$, $a_{n,(i+1)}$ to obtain a smoothed pixel data $H_{n,(i+1)}$ wherein j refers to the jth column of smoothed pixel data from the horizontal mean value computing device;

said memory control unit controlling said first column memory means to store said original pixel data $a_{n,(i+1)}$ therein so as to replace said original pixel data $a_{n,(i-1)}$ after said smoothed pixel data $H_{n,j}$, $H_{n,(j+1)}$ have been obtained;

said horizontal mean value computing device generating a two-dimensional smoothed image signal after all of said original pixel data have been processed, said smoothed image signal consisting of a plurality of said smoothed pixel data $H_{1,1}, H_{1,2}, \ldots H_{N,J}$ grouped into a number (J) of successive smoothed column scan lines;

an intermediate stage memory device receiving said smoothed pixel data $H_{1,1}, H_{1,2}, \ldots H_{N,J}$ two at each time, one of said smoothed pixel data $H_{n,j}$ that is being provided at each time being an nth smoothed pixel data of a jth one of said smoothed column scan lines, the other one of said smoothed pixel data $H_{n,(j+1)}$ that is being provided at each time being an nth smoothed pixel data of a (j+1)th one of said smoothed column scan lines, said memory device including a second column memory means for storing said smoothed pixel data $H_{1,(j-1)}, H_{2,(j-1)}, \ldots H_{N,(j-1)}$ of a (j−1)th one of said smoothed column scan lines;

said memory control unit controlling said second column memory means to output said smoothed pixel data $H_{n,(j-1)}$ when said smoothed pixel data $H_{n,j}$, $H_{n,(j+1)}$ are generated by said horizontal mean value computing device;

said memory device further including a row memory means for storing said smoothed pixel data $H_{n,(j-1)}$ from said second column memory means and said smoothed pixel data $H_{n,j}$, said row memory means being controlled by said memory control unit to output said smoothed pixel data $H_{n,(j-1)}$, $H_{n,j}$;

said memory control unit further controlling said second column memory means to store said smoothed pixel data $H_{n,(j+1)}$ therein so as to replace said smoothed pixel data $H_{n,(j-)}$ after said smoothed pixel data $H_{n,(j-1)}$, $H_{n,j}$ have been stored in said row memory means;

a transverse mean value computing device receiving said smoothed pixel data $H_{n,(j-1)}$, $H_{n,j}$ from said row memory means and succeeding smoothed pixel data $H_{(n+1),(j-1)}$, $H_{(n+1),j}$ from said horizontal mean value computing device, said transverse mean value computing device including:

a first transverse averager receiving said smoothed pixel data $H_{n,(j-1)}$, $H_{(n+1),(j-1)}$ and determining the mean value $T_{k,j}$ of said smoothed pixel data $H_{n,(j-1)}$, $H_{(n+1),(j-1)}$ so as to obtain a final smoothed pixel data $T_{k,j}$; and a second transverse averager receiving said smoothed pixel data $H_{n,j}$, $H_{(n+1),j}$ and determining the mean value $T_{k,(j+1)}$ of said smoothed pixel data $H_{n,j}$, $H_{(n+1),j}$ so as to obtain a final smoothed pixel data $T_{k,(j+1)}$ wherein k refers to the kth row of smoothed pixel data from the transverse mean value computing device; and an output buffer for storing said final smoothed pixel data $T_{k,j}$, $T_{k,(j+1)}$ therein;

said memory control unit further controlling said row memory means to store said succeeding smoothed pixel data $H_{(n+1),(j-1)}$, $H_{(n+1),j}$ in said row memory means so as to replace said smoothed pixel data $H_{n,(j-1)}$, $H_{n,j}$ after said final smoothed pixel data $T_{k,j}$, $T_{k,(j+1)}$ have been stored in said output buffer.

* * * * *

UNITED STATES PATENT AND TRADEMARK OFFICE
CERTIFICATE OF CORRECTION

PATENT NO. : 5,420,969  
DATED : May 30, 1995  
INVENTOR(S) : Ching-Sheng Lie et al Page 1 of 2

It is certified that error appears in the above-indentified patent and that said Letters Patent is hereby corrected as shown below:

On the Title Page, under "Inventors", "Hwaw-Jang" should be --Haw-Jang--.

On the Title Page, under "Attorney, Agent, or Firm" "Harness, Dickey & Pierce" should be --Harness, Dickey & Pierce, P.L.C.--.

Column 2, line 39, "$aN,(i-1)$" should be --$a_{N,(i-1)}$--.

Column 2, line 49, "$a_{n,1}$," should be --$a_{n,i}$,--.

Column 8, line 30, "$all$" should be --$a_{11}$--.

Column 9, line 68, Claim 1, "$a_{n,(i1)}$" should be --$a_{n,(i+1)}$--.

Column 10, line 63, Claim 3, "$H_{n,(-1)}$" should be --$H_{n,(j-1)}$--.

Column 10, line 64, Claim 3, "$H_{(n+1)j}$" should be --$H_{(n+1),j}$--.

Column 11, line 21, Claim 4, after "grouped" insert --into--.

Column 11, line 50, Claim 4), "$a_{n,(i+1)}$" should be --$a_{n,(i-1)}$--.

Column 12, line 53, Claim 4), "$T_{k(j+1)}$" should be --$T_{k,(j+1)}$--.

Column 13, line 15, Claim 6, "$a_{N,J}$" should be --$a_{N,I}$--.

Column 13, line 28, Claim 6, "$a_{N-1)}$" should be --$a_{N,(i-1)}$--.

UNITED STATES PATENT AND TRADEMARK OFFICE
CERTIFICATE OF CORRECTION

PATENT NO. : 5,420,969
DATED : May 30, 1995
INVENTOR(S) : Ching-Sheng Lie et al

It is certified that error appears in the above-indentified patent and that said Letters Patent is hereby corrected as shown below:

Column 13, line 42, Claim 6, "$a_{n,j}$" should be --$a_{n,i}$--.

Column 13, line 43, Claim 6, "$H_{n,(i+1)}$" should be --$H_{n,(j+1)}$--.

Column 14, line 16, Claim 6, ".pixel" should be --pixel--.

Column 14, line 28, Claim 6, "$H_{n,(j-)}$" should be --$H_{n,(j-1)}$--.

Column 14, line 41, Claim 6, "$T_{k,d}$" should be --$T_{k,j}$--.

Signed and Sealed this

Nineteenth Day of September, 1995

Attest:

BRUCE LEHMAN

*Attesting Officer*      *Commissioner of Patents and Trademarks*